(12) United States Patent
Ciesielski et al.

(10) Patent No.: US 12,304,972 B2
(45) Date of Patent: May 20, 2025

(54) CELLULOSE-CONTAINING FILTRATION MATERIALS AND METHODS OF MAKING THE SAME

(71) Applicant: Alliance for Sustainable Energy, LLC, Golden, CO (US)

(72) Inventors: Peter N. Ciesielski, Arvada, CO (US); Michael E. Himmel, Littleton, CO (US); Todd Brian Vinzant, Elizabeth, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 629 days.

(21) Appl. No.: 17/477,195

(22) Filed: Sep. 16, 2021

(65) Prior Publication Data
US 2022/0081490 A1    Mar. 17, 2022

Related U.S. Application Data

(60) Provisional application No. 63/201,002, filed on Apr. 8, 2021, provisional application No. 63/078,975, filed on Sep. 16, 2020.

(51) Int. Cl.
| | | |
|---|---|---|
| *C08B 15/10* | (2006.01) | |
| *B01D 39/16* | (2006.01) | |
| *B82Y 40/00* | (2011.01) | |
| *D06M 15/05* | (2006.01) | |
| *D06M 15/71* | (2006.01) | |
| *D06M 15/715* | (2006.01) | |

(52) U.S. Cl.
CPC .......... *C08B 15/10* (2013.01); *B01D 39/1615* (2013.01); *D06M 15/05* (2013.01); *D06M 15/71* (2013.01); *D06M 15/715* (2013.01); *B01D 2239/0258* (2013.01); *B01D 2239/0654* (2013.01); *B82Y 40/00* (2013.01)

(58) Field of Classification Search
None
See application file for complete search history.

(56) References Cited

U.S. PATENT DOCUMENTS

| | | |
|---|---|---|
| 2007/0295334 A1 | 12/2007 | Nonomura |
| 2015/0157971 A1* | 6/2015 | Tong .................. D01D 5/0076 |
| | | 264/413 |

FOREIGN PATENT DOCUMENTS

WO    2016/101848 A1    6/2016

OTHER PUBLICATIONS

Konda et al., "Aerosol Filtration Efficiency of Common Fabrics Used in Respiratory Cloth Masks", ACS Nano, 2020, vol. 14, pp. 6339-6347.

* cited by examiner

*Primary Examiner* — Arti Singh-Pandey
(74) *Attorney, Agent, or Firm* — Michael A. McIntyre

(57) ABSTRACT

The present disclosure relates to a composition that includes a base layer having an outer surface and a first thickness and a material that includes a plurality of cellulose nanofibers in physical contact with the outer surface, where the composition has an average filtration efficiency of less than or equal to 90% for particles having a characteristic length between about 50 nm and about 100 μm and the composition is characterized by an average inhalation resistance of less than or equal to 35 mm $H_2O$ as measured across the first thickness and the material.

14 Claims, 18 Drawing Sheets

CELLULOSE-CONTAINING FILTRATION MATERIALS AND METHODS OF MAKING THE SAME

CROSS-REFERENCE TO RELATED APPLICATIONS

This application claims priority from U.S. Provisional Patent Application No. 63/078,975 filed on Sep. 16, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is a composition that includes a base layer having an outer surface and a first thickness and a material that includes a plurality of cellulose nanofibers in physical contact with the outer surface, where the composition has an average filtration efficiency of less than or equal to 90% for particles having a characteristic length between about 50 nm and about 100 μm and the composition is characterized by an average inhalation resistance of less than or equal to 35 mm $H_2O$ as measured across the first thickness and the material. In some embodiments of the present disclosure, the material may penetrate at least a portion of the first thickness of the base layer.

In some embodiments of the present disclosure, the base layer may include at least one of a woven fabric and/or a non-woven fabric. In some embodiments of the present disclosure, the base layer may include a plurality of hydroxyl groups on the outer surface. In some embodiments of the present disclosure, the material may be bonded to the base layer by hydrogen bonding between the hydroxyl groups and the material. In some embodiments of the present disclosure, the material may be bonded to the base layer using a crosslinking agent that reacts with at least a portion of the hydroxyl groups to form a covalent bond. In some embodiments of the present disclosure, the base layer may include at least one of a cotton, a cellulose derivative fabric, a wool, a silk, and/or a synthetic fiber. In some embodiments of the present disclosure, the base layer may include at least one of a polyester and/or a polypropylene.

In some embodiments of the present disclosure, the base layer may include a woven fabric having a thread count between about 100 per inch and about 500 per inch. In some embodiments of the present disclosure, the base layer may be a non-woven fabric configured for an HVAC filter having a minimum efficiency reporting value (MERV) between about 1 and about 20. In some embodiments of the present disclosure, the first thickness may be between 100 μm and 3.5 mm. In some embodiments of the present disclosure, the composition may further include a loading of cellulose nanofibers between 0.01 and 1 mg per square centimeter of base material. In some embodiments of the present disclosure, the composition may be substantially insoluble in water at temperatures less than about 100° C.

An aspect of the present disclosure is a method that includes preparing a slurry that includes cellulose nanofibers in a liquid, depositing the slurry onto a base layer, resulting in a coating of the slurry on a first surface of the base layer, and removing at least a portion of the liquid, resulting in the forming solid cellulose nanofibers on and in the base layer. In some embodiments of the present disclosure, the liquid may include at least one of water and/or an organic solvent. In some embodiments of the present disclosure, the cellulose nanofibers may be present in the slurry at a concentration between about 0.001 wt % and about 1 wt %. In some embodiments of the present disclosure, the depositing may be performed by at least one of filtering, dip coating, curtain coating, blade coating, spray coating, spin coating, and/or soaking. In some embodiments of the present disclosure, the filtering may include applying the slurry to a first surface of the base layer and applying a vacuum to a second surface of the base layer, where the vacuum draws the liquid through the base layer and the vacuum leaves at least a portion of the cellulose nanofibers as a solid layer on the base layer. In some embodiments of the present disclosure, the vacuum may be between about 1 Torr absolute and about 200 Torr absolute.

An aspect of the present disclosure is a filter media that includes a composition that includes a base layer having an outer surface and a first thickness and a material that includes a plurality of cellulose nanofibers in physical contact with the outer surface, where the composition has an average filtration efficiency of less than or equal to 90% for particles having a characteristic length between about 50 nm and about 100 μm and the composition is characterized by an average inhalation resistance of less than or equal to 35 mm $H_2O$ as measured across the first thickness and the material.

BRIEF DESCRIPTION OF DRAWINGS

Some embodiments are illustrated in referenced figures of the drawings. It is intended that the embodiments and figures disclosed herein are to be considered illustrative rather than limiting.

Figure 1:
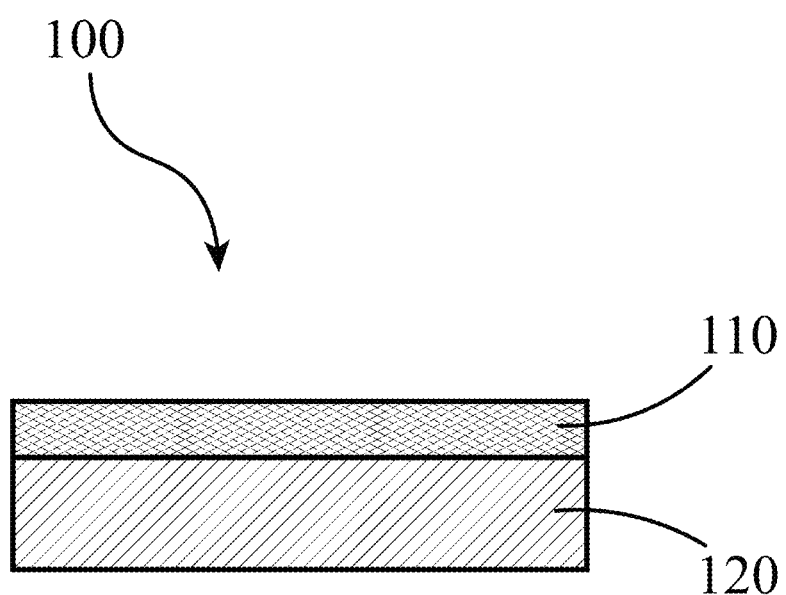
FIG. 1 illustrates a composition for filtering, according to some embodiments of the present disclosure.

| REFERENCE NUMERALS | |
|---|---|
| 100 | composition |
| 110 | base layer |
| 120 | material |
| 200 | method |
| 210 | preparing |
| 220 | depositing |
| 230 | removing |
| 240 | heating |

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

FIG. 1 illustrates a composition 100 for filtering particles, particulate, microorganisms, and/or viruses from the environment, according to some embodiments of the present disclosure. In this example, the composition 100 includes a base layer 110 having an outer surface and a first thickness and a material 120 that includes a plurality of cellulose nanofibers in physical contact with the outer surface of the base layer 110. In some embodiments of the present disclosure, such a composition 100 may be configured to provide an average filtration efficiency of particles having characteristic length between about 50 nm and about 100 μm of up to about 90%, 95%, 99%, or 99.9%, while providing an average inhalation resistance of less than or equal to 35 mm $H_2O$ as measured across the composition. In some embodiments of the present disclosure, a material and/or composition as described herein may be biodegradable, such that the material may be composted instead of disposed of in a landfill and/or a waste incinerator.

Referring again to FIG. 1, in some embodiments of the present disclosure, the material 110 may form a distinct second layer positioned on the surface of the base layer 110. In some cases, the formation of such a second layer and the base layer 110 may result in a distinct interface, as shown in FIG. 1. However, in some embodiments of the present disclosure, the material 110 may penetrate at least a portion of the first thickness of the base layer 110, such that the cellulose nanofibers are dispersed throughout the first thickness of the base layer 110 and a single interface like that shown in FIG. 1 is not distinct and/or visible.

In some embodiments of the present disclosure, a base layer 110 may include at least one of a woven fabric and/or a non-woven fabric. Further, a base layer 110 may include a plurality of hydroxyl groups on the outer surface, such that the material 120 may be bonded to the base layer 110 by hydrogen bonding between the hydroxyl groups and the material 120. In some embodiments of the present disclosure, a material 120 may be bonded to a base layer 110 using a crosslinking agent (not shown) such as citric acid, citrate, acrylic acid, acrylate, glutaraldehyde, terephthalaldehyde, terephthalalic acid, and/or terephthalate, which react as a result of elevated temperature or irradiation with at least a portion of the hydroxyl groups to form a covalent bond. In some embodiments of the present disclosure, a base layer 110 may include at least one of a cotton or cellulose derivative fabric, wool, silk, fabric consisting of synthetic fibers, such as polyester, and blends of these materials, and/or a melt-blown membrane such as a modified polypropylene and/or other plastic subjected to hydrophilic finishing.

Cotton-based materials are biodegradable and common in HVAC applications. Thus, as described herein, in some embodiments of the present disclosure, a cotton filtration media may be used as a base substrate for CNF modification such that the entire assembly is composed of plant-derived, renewable, biodegradable materials. Chemical modifications of the nanocellulose surface may, among other things, facilitate robust adhesion to the base filtration media, mitigate mold growth and moisture sensitivity, and optimize longevity of filtration performance. Specifically, silanization of surface hydroxyl groups can increase hydrophobicity of nanocellulose while retaining its biodegradable nature. This treatment can be performed in an aqueous solution and can also introduce chemical functionalities that promote crosslinking of the nanofibers and covalent attachment to underlying cotton support.

In some embodiments of the present disclosure, the base layer 110 may include a woven fabric having a thread count greater than about 100, or greater than about 500, or between about 100 and about 500 threads per inch. In some embodiments of the present disclosure, the first thickness may be between 100 µm and 3.5 mm, or between about 0.2 mm and about 0.8 mm. In some embodiments of the present disclosure, a loading of cellulose nanofibers may be between about 0.01 and about 1 mg per square centimeter of base material, or between about 0.2 and about 0.5 mg per square centimeter of base material. In some embodiments of the present disclosure, the composition 100 may be substantially insoluble in water at temperatures less than about 100° C.

Figure 2:
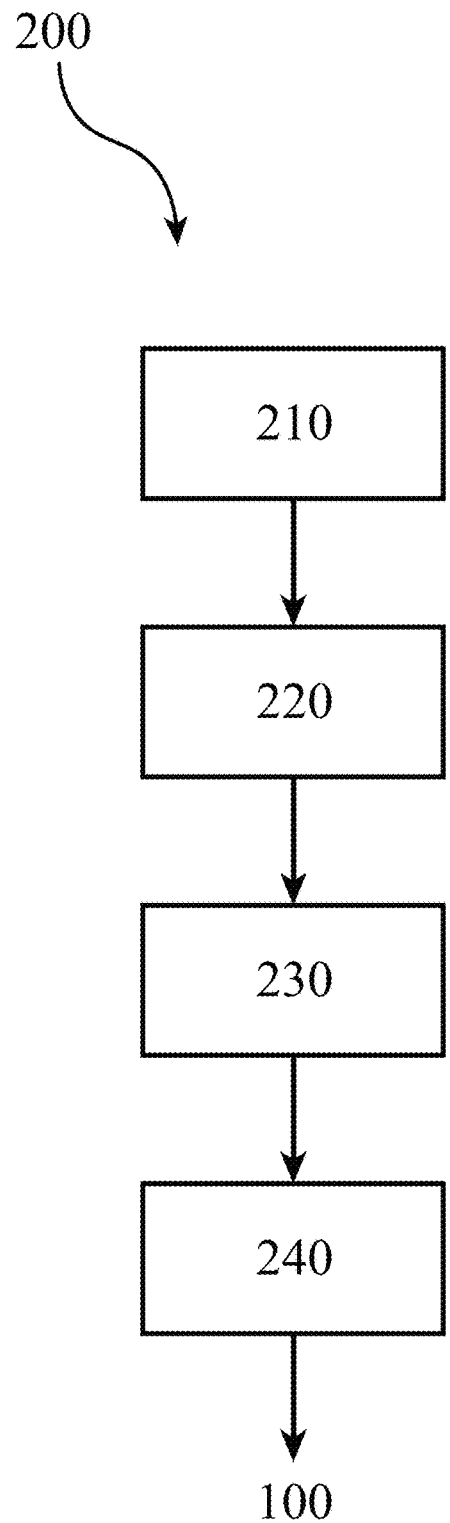
FIG. 2 illustrates a method for manufacturing a composition for filtering, according to some embodiments of the present disclosure.

FIG. 2 illustrates a method 200 for making a composition 100 like that illustrated in FIG. 1, according to some embodiments of the present disclosure. This exemplary method 200 includes preparing 210 a slurry that includes cellulose nanofibers in a liquid, depositing 220 the slurry onto a base layer, resulting in a coating of the slurry on a first surface of the base layer, and removing 230 at least a portion of the liquid, resulting in the forming solid cellulose nanofibers on and in the base layer. In some embodiments of the present disclosure, the liquid may include at least one of water, a polar solvent such as an alcohol (e.g., methanol, ethanol, propanol), and/or a non-polar solvent such as hexane or benzene.

In some embodiments of the present disclosure, the cellulose nanofibers may be present in the slurry at a concentration between about 0.001 wt % and about 1 wt %. In some embodiments of the present disclosure, the depositing may be performed by at least one of filtering, dip coating, curtain coating, blade coating, spray coating, spin coating, and/or soaking. In some embodiments of the present disclosure, the filtering may include applying the slurry to a first surface of the base layer and applying a vacuum to a second surface of the base layer, where the vacuum draws the liquid through the base layer, and the vacuum leaves at least a portion of the cellulose nanofibers as a solid layer on the base layer.

In some embodiments of the present disclosure, the vacuum applied in vacuum filtration may be between 1 and 200 Torr absolute. In some embodiments of the present disclosure, the vacuum may be provided for a period of time between 10 and 300 seconds. In some embodiments of the present disclosure, the slurry may further include a crosslinker of at least one of a crosslinker having at least one of a compound comprising a carboxylic acid group such as citric acid, a compound having an epoxide such as epichlorohydrin, and/or a compound having an acryloyl functional group such as acrylic acid. In some embodiments of the present disclosure, the method may further include, after the preparing, heating the slurry and the base layer, where the heating results in the crosslinker reacting with at least one of the cellulose nanofibers or the base layer. In some embodiments of the present disclosure, the heating may be performed at a temperature up to about 100° C. for a period of time between 1 minute and 10 hours. In some embodiments of the present disclosure, the depositing was achieved by soaking a base layer in a solution containing CNFs at a temperature between about 25° C. and about 80° C. for a period of time between about 1 minute and about 24 hours. Next, the resultant CNF-containing base layer was at least one of freeze dried and/or oven dried at a temperature between about 50° C. and about 180° C. for a period time between about 10 minutes and about 24 hours, resulting in the final filtration material.

Experimental Results

An initial concentration study was performed to assess the impact of CNF loading on the filtration efficiency of woven cotton fabric. Aqueous CNF slurries were prepared having weight percentages of 0.5 wt %, 0.05 wt %, 0.01 wt %, and 0.005 wt %. The depositing was performed by placing a section of cotton fabric over the filter of a Buchner funnel, and 10 mL of the slurry was poured into the top of the funnel and vacuum was applied. The area of fabric exposed was 4.7 cm. The samples were then allowed to air dry in ambient conditions overnight to remove any residual water.

Figure 3:
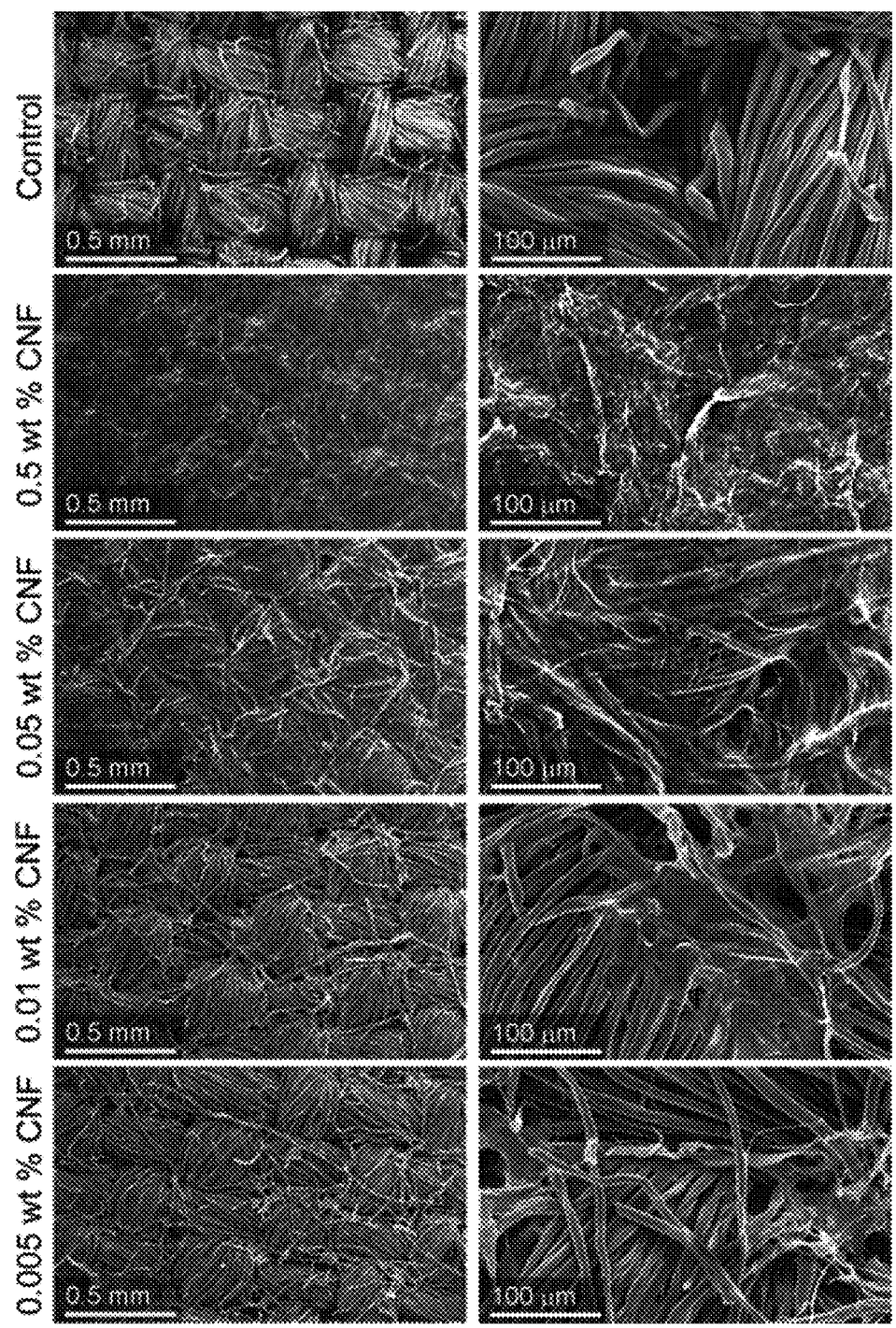
FIG. 3 illustrates SEM micrographs of cotton fabric modified by cellulose nanofibrils (CNF), according to some embodiments of the present disclosure. The concentrations shown on the left indicate the weight percent of CNF used in the 10 mL aqueous slurry deposited.
Figure 4:
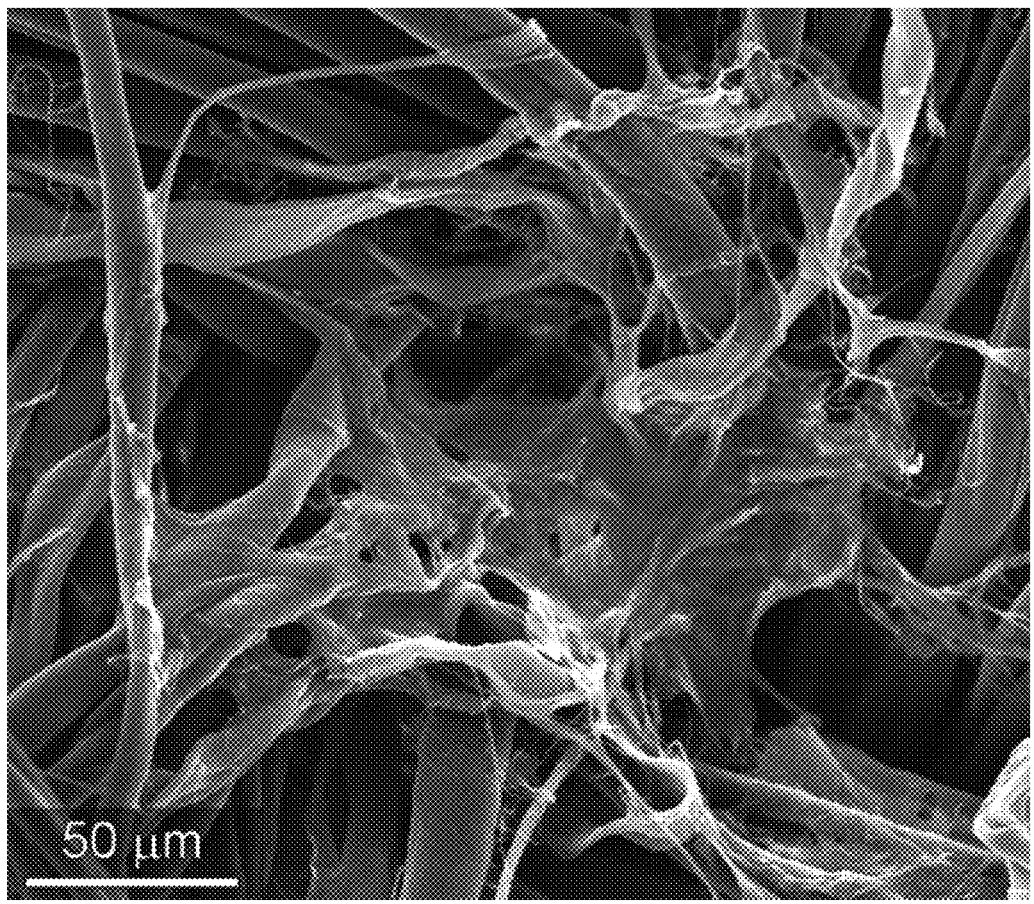
FIG. 4 illustrates an SEM micrograph of the CNF matrix observed on the sample prepared with 0.005 wt % CNF, according to some embodiments of the present disclosure.

SEM images of the samples are presented in FIG. 3. At the highest concentration (0.5 wt %), nearly complete coverage of CNF was observed with little remaining porosity. As the concentration was decreased, more of the original porosity from the cotton fabric becomes visible. A CNF matrix was observed to be present in many of the gaps between the woven fibers, which reduces the macroporosity and likely increases the tortuosity of the remaining pores. A higher-magnification view of the sample prepared with 0.005 wt % CNF is shown in FIG. 4. This image reveals the nanoscale dimensions of the CNF and indicates intimate integration of the CNF and the cotton microfibers. FIG. 4 also shows that the CNF can aggregate into semi-continuous films with little porosity in some regions. It is possible that freeze-drying the material (rather than air drying) may help mitigate this aggregation and better preserve the micro- and nanoscale features of the fibrils.

Figure 5:
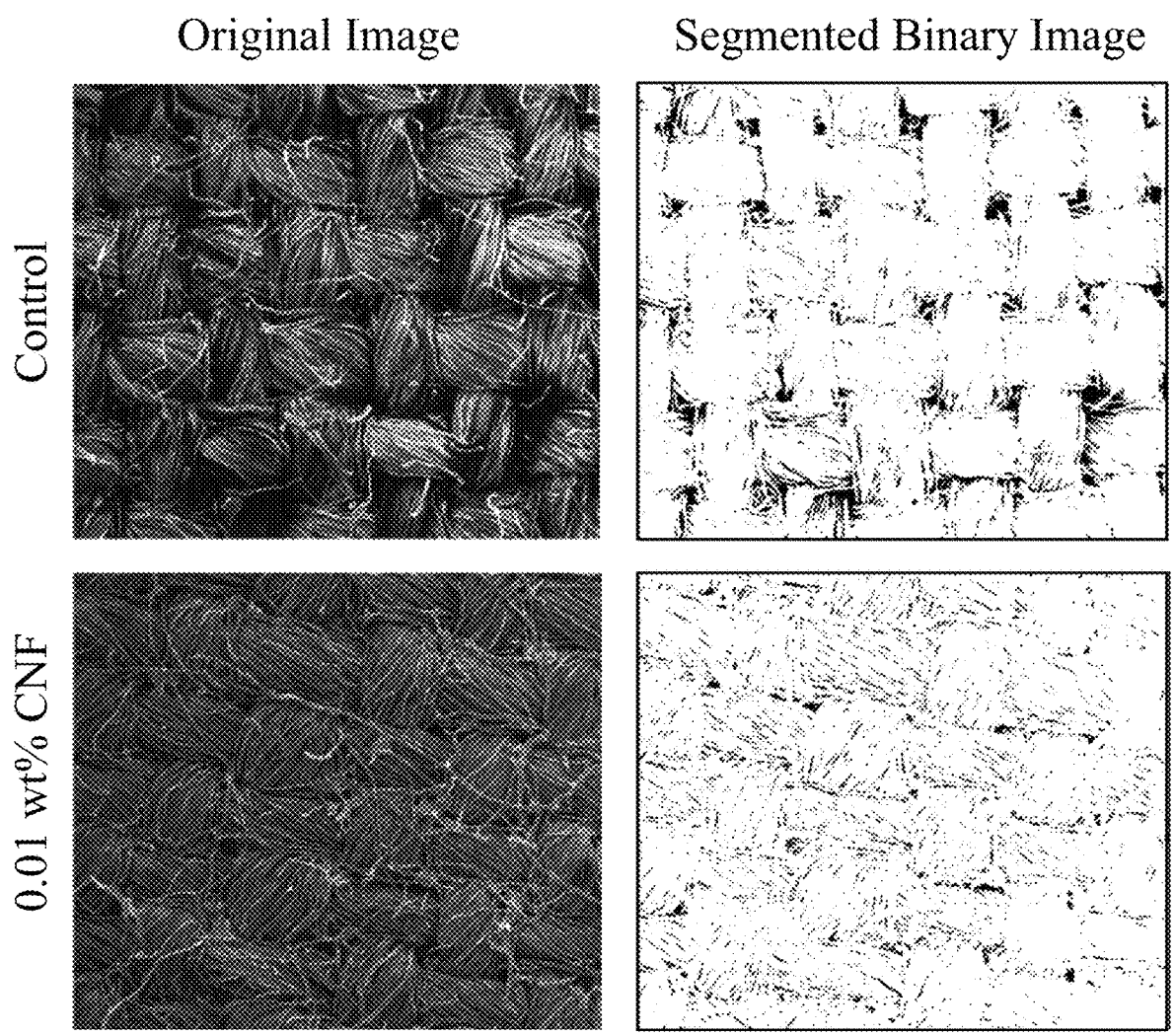
FIG. 5 illustrates the image analysis procedure applied to SEM micrographs from which the pore size distribution may be estimated, according to some embodiments of the present disclosure. Original SEM micrographs (shown in the left column) are converted to image binaries (shown on the right column) which can be used to calculate the size distribution of the thresholder regions, which are representee of pores in the material.
Figure 6:
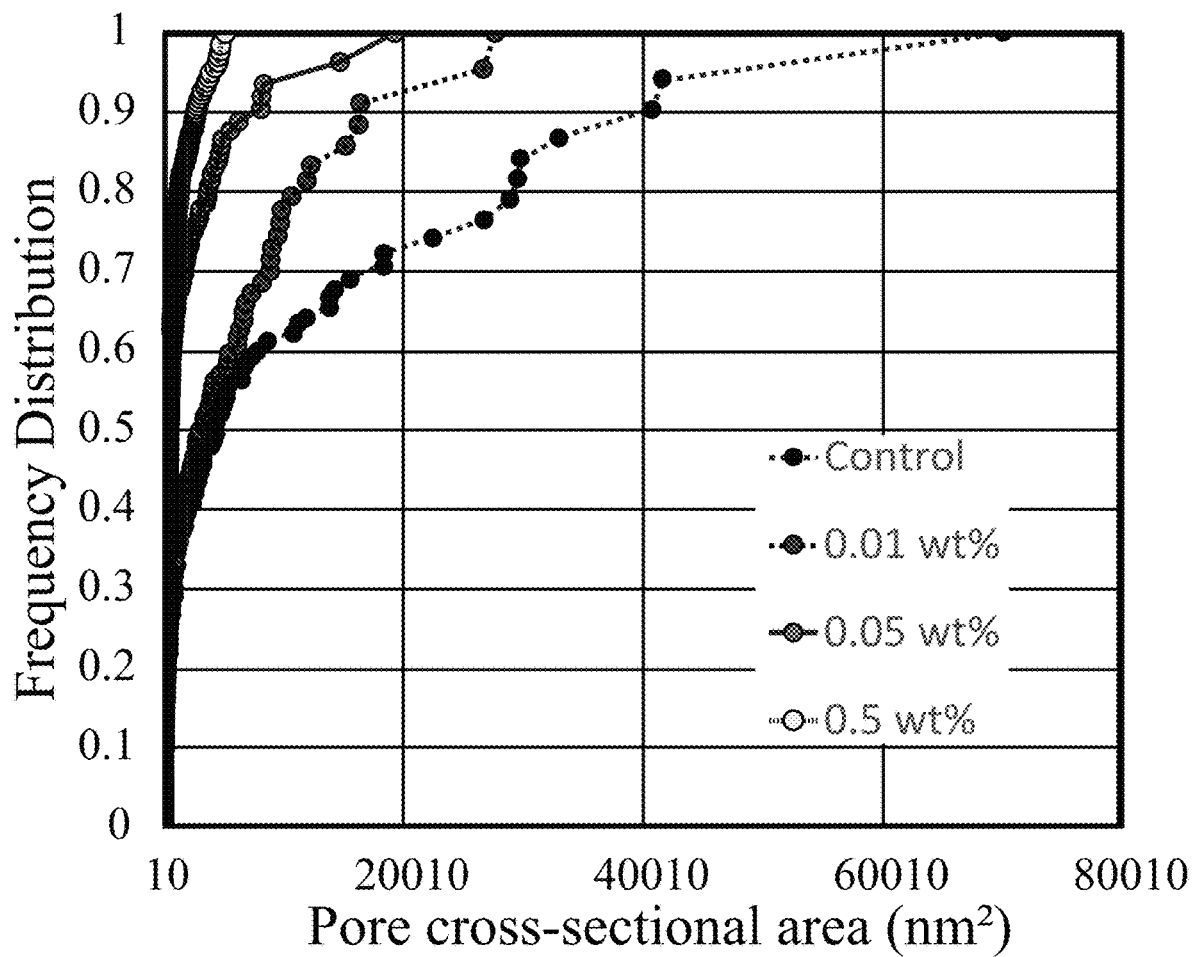
FIG. 6 illustrates cumulative frequency distributions, obtained by the method illustrated in FIG. 5, for three different CNF loadings and the control fabric, according to some embodiments of the present disclosure. These data reveal the expected trends of decreasing pore size distribution with increasing CNF loading.
Figure 7:
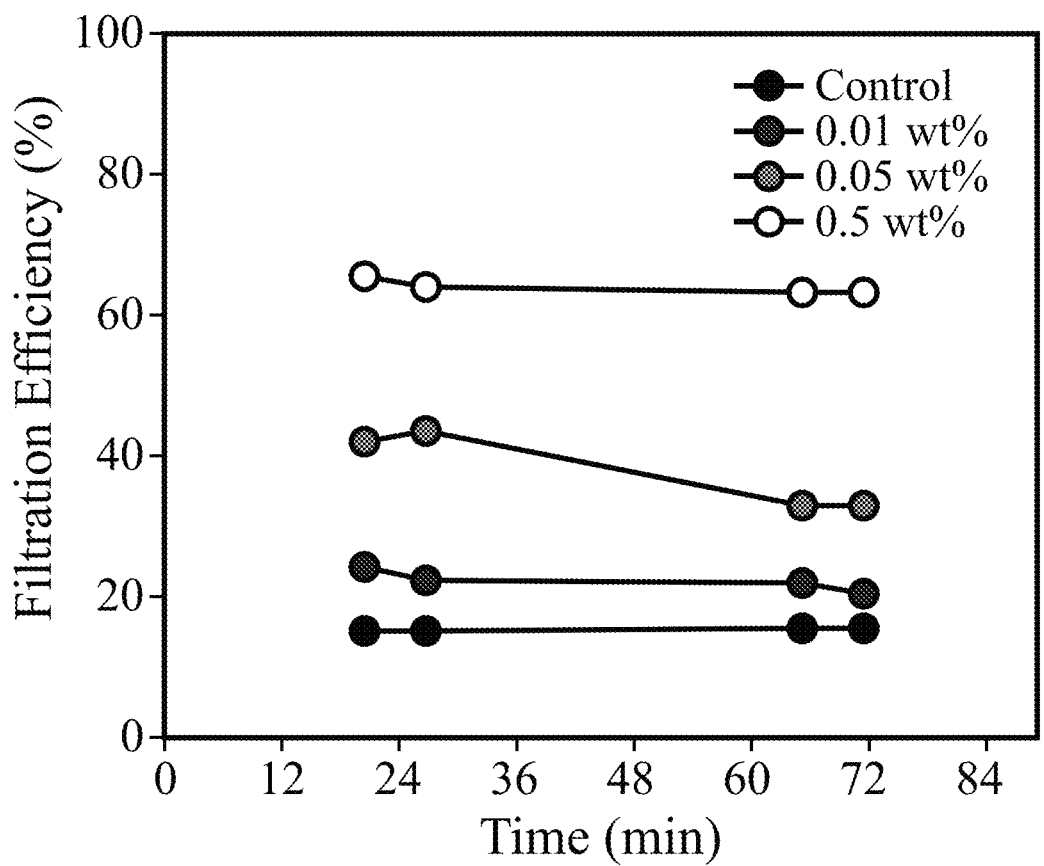
FIG. 7 illustrates filtration efficiencies calculated using total particle number concentration over time, according to some embodiments of the present disclosure.
Figure 8:
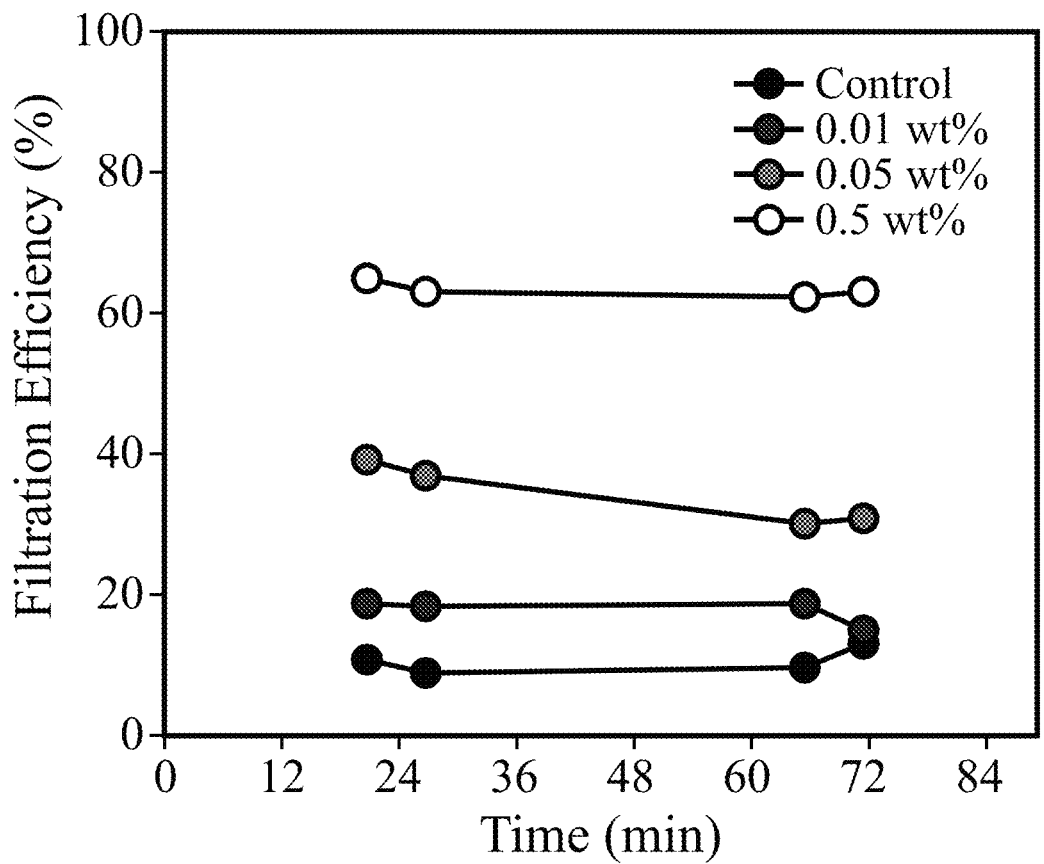
FIG. 8 illustrates filtration efficiencies calculated using total particle mass concertation over time, according to some embodiments of the present disclosure.
Figure 9:
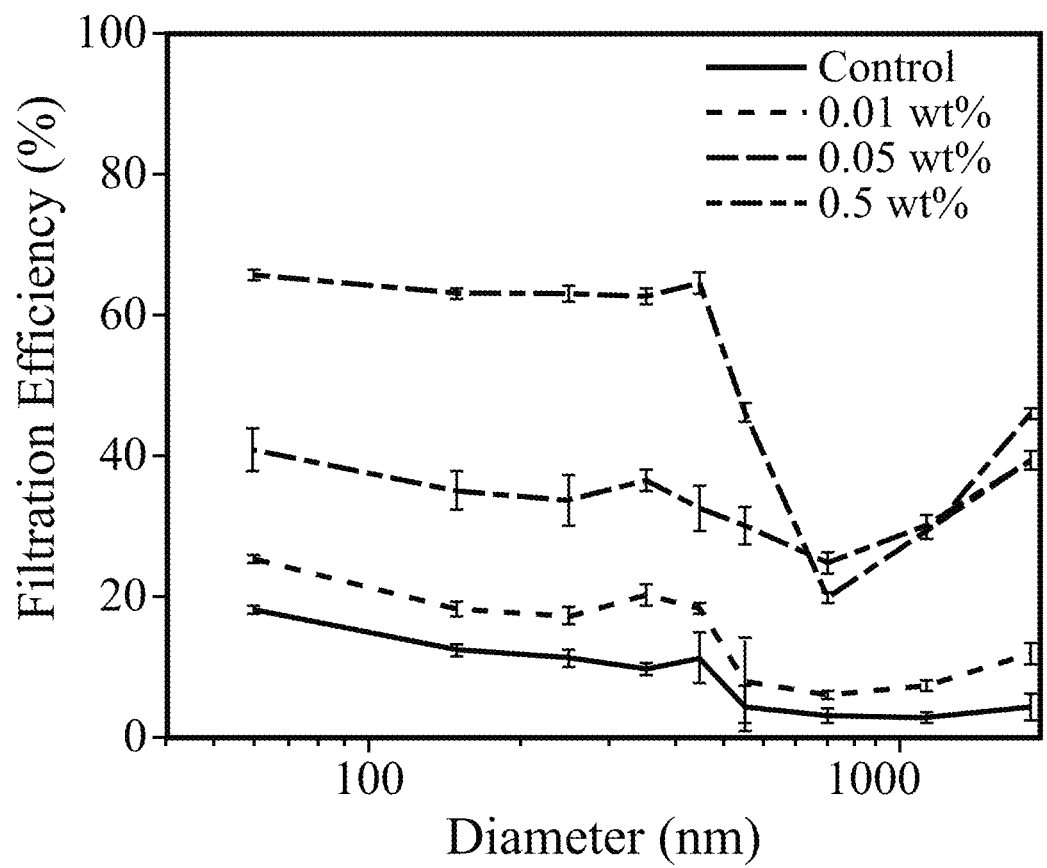
FIG. 9 illustrates size-resolved filtration efficiencies calculated as a function of particle number distribution, according to some embodiments of the present disclosure. The whiskers represent standard error (N=4).
Figure 10:
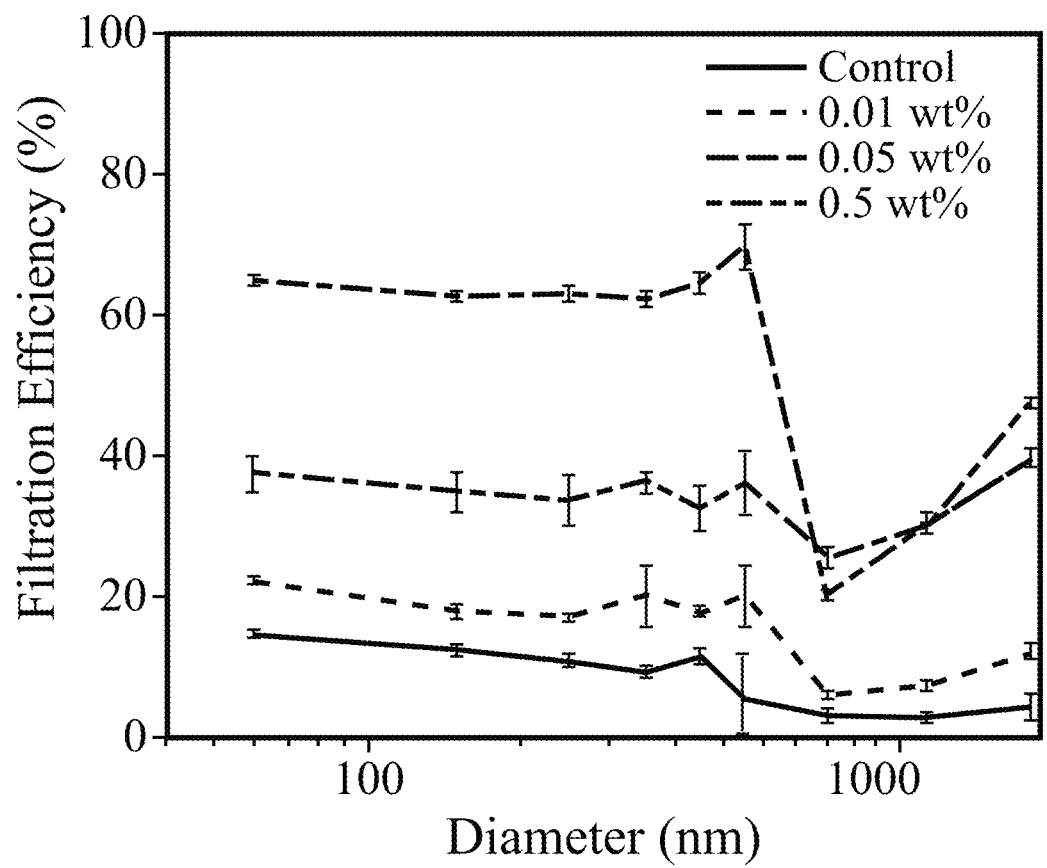
FIG. 10 illustrates size-resolved filtration efficiencies calculated as a function of particle mass distribution, according to some embodiments of the present disclosure. The whiskers represent standard error (N=4).
Figure 11:
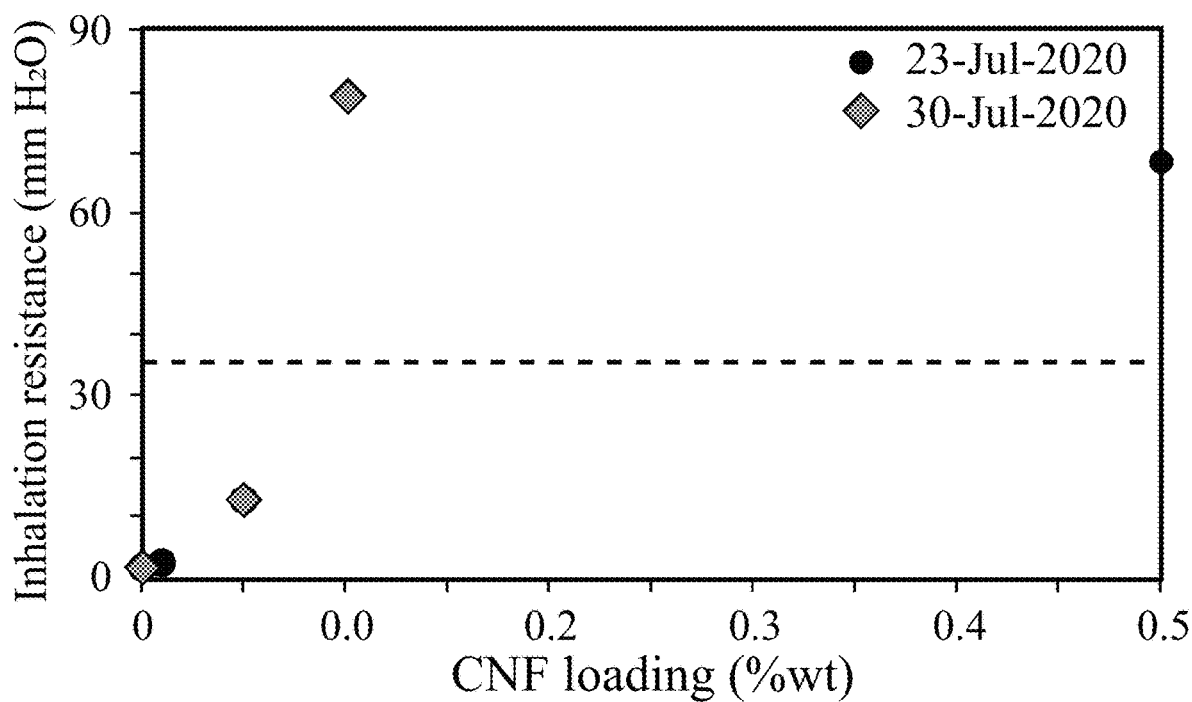
FIG. 11 illustrates inhalation resistances (pressure drop) of different samples as a function of loading level, according to some embodiments of the present disclosure.
Figure 12:
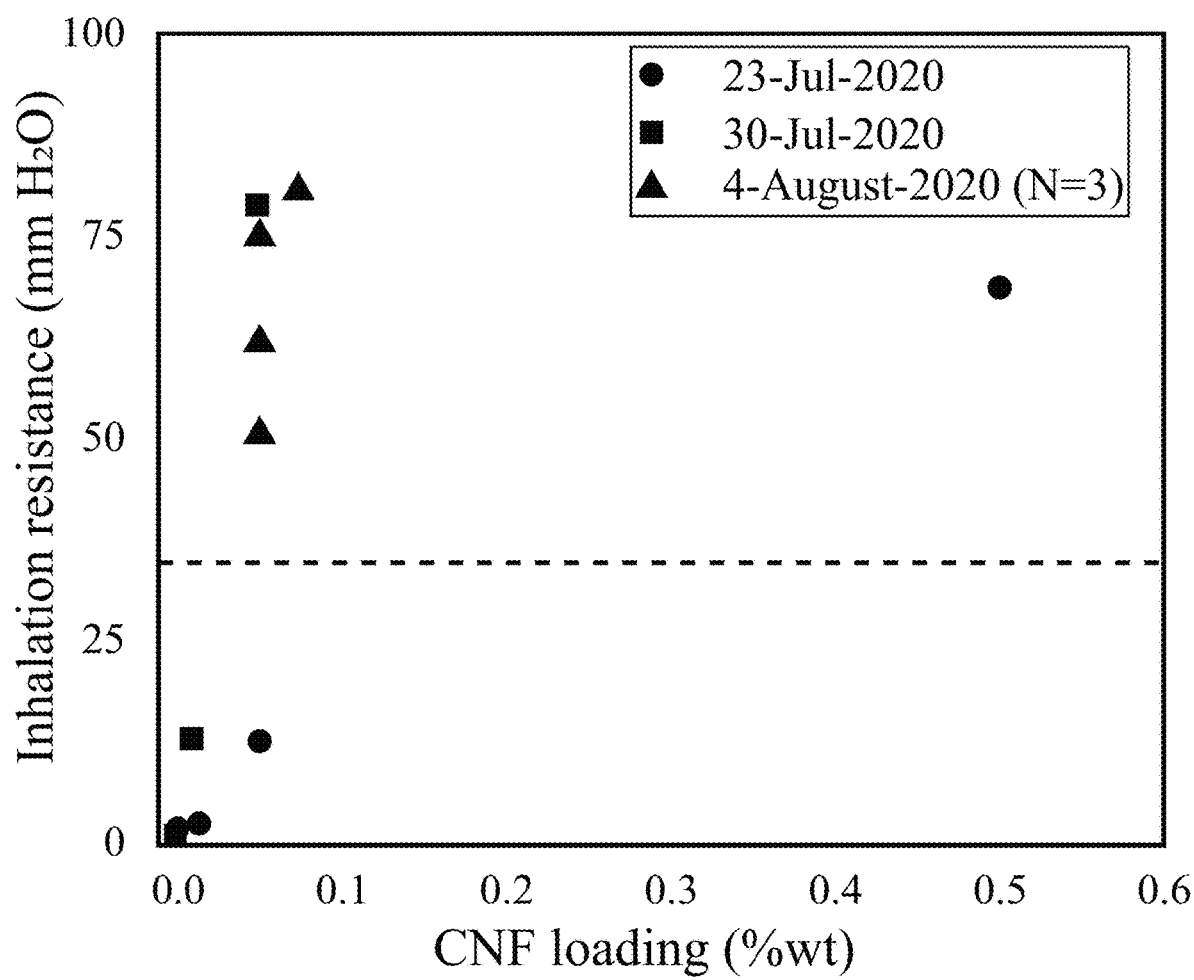
FIG. 12 illustrates inhalation resistances (pressure drop) of different samples as a function of loading level, according to some embodiments of the present disclosure.
Figure 13:
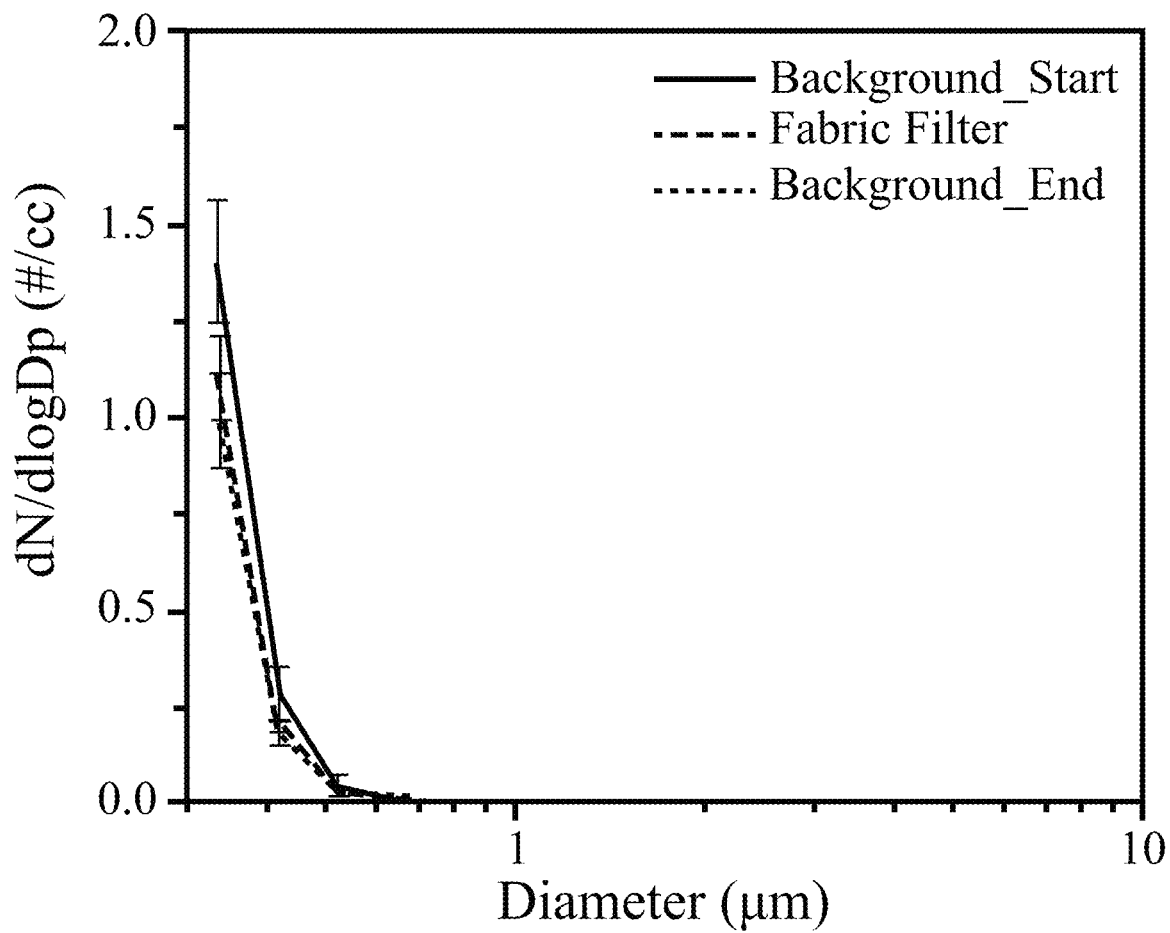
FIG. 13 illustrates average aerosol size distributions inside the chamber for the three different time periods, according to some embodiments of the present disclosure. The whiskers represent standard deviation (N=10).
Figure 14:
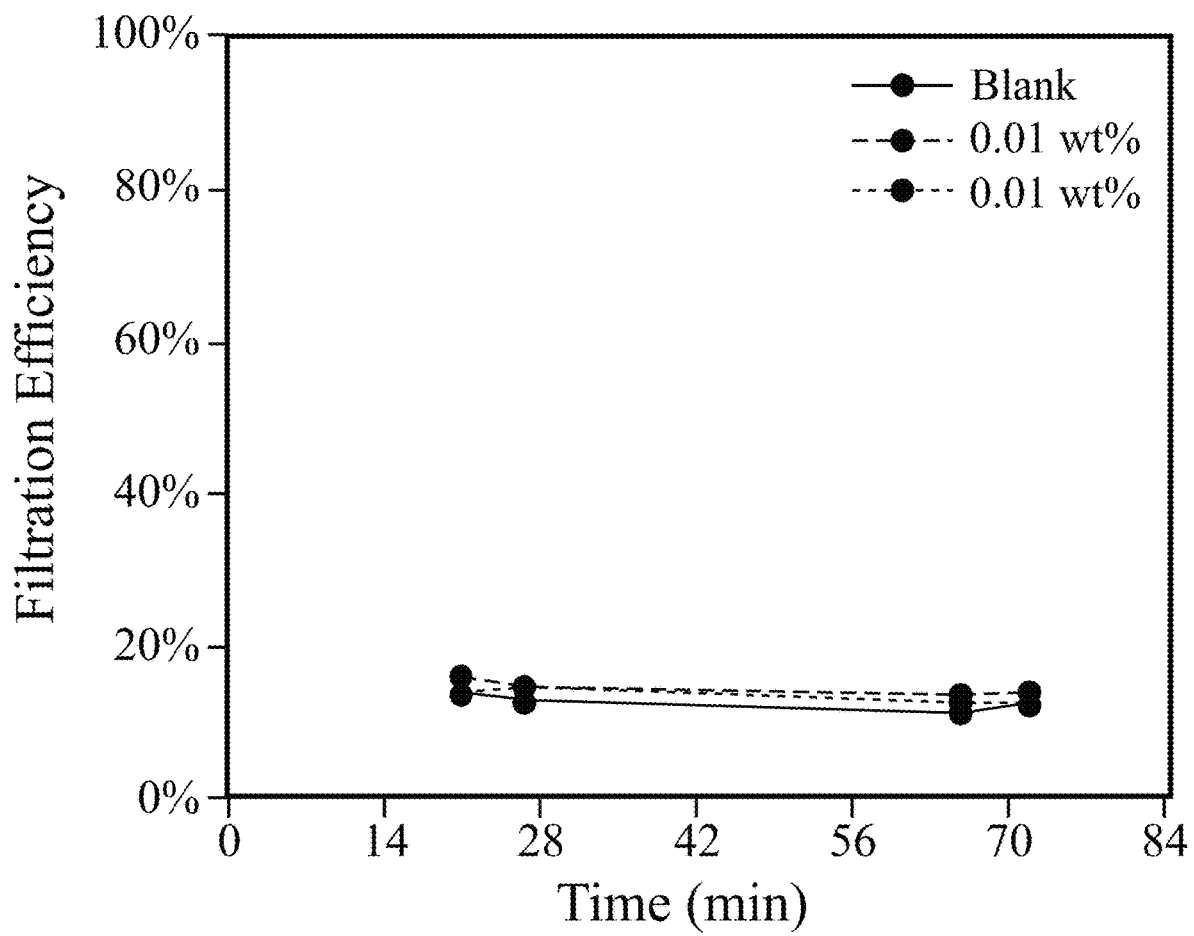
FIG. 14 illustrates filtration efficiencies calculated using total particle number concentration over time, according to some embodiments of the present disclosure.
Figure 15:
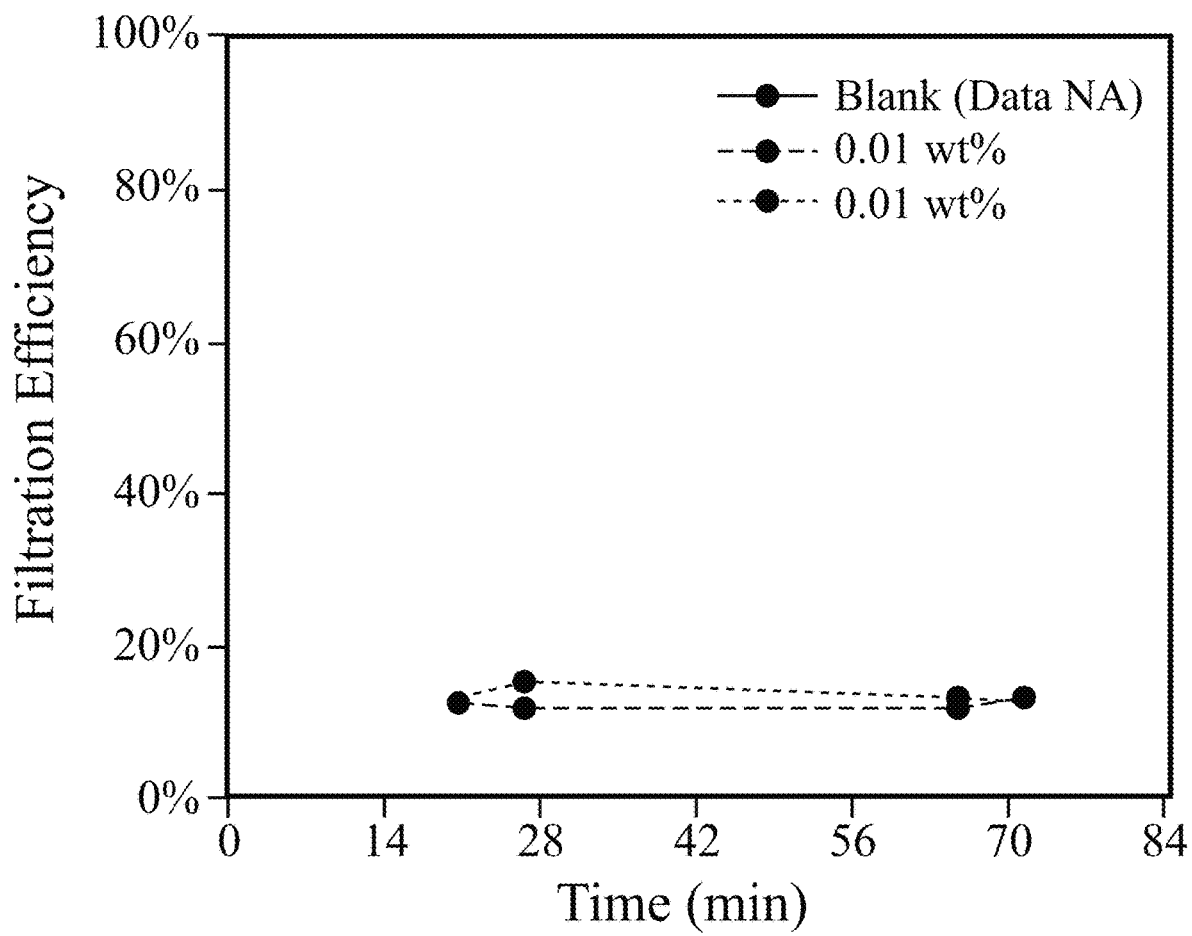
FIG. 15 illustrates filtration efficiencies calculated using total particle number concentration over time, according to some embodiments of the present disclosure.
Figure 16:
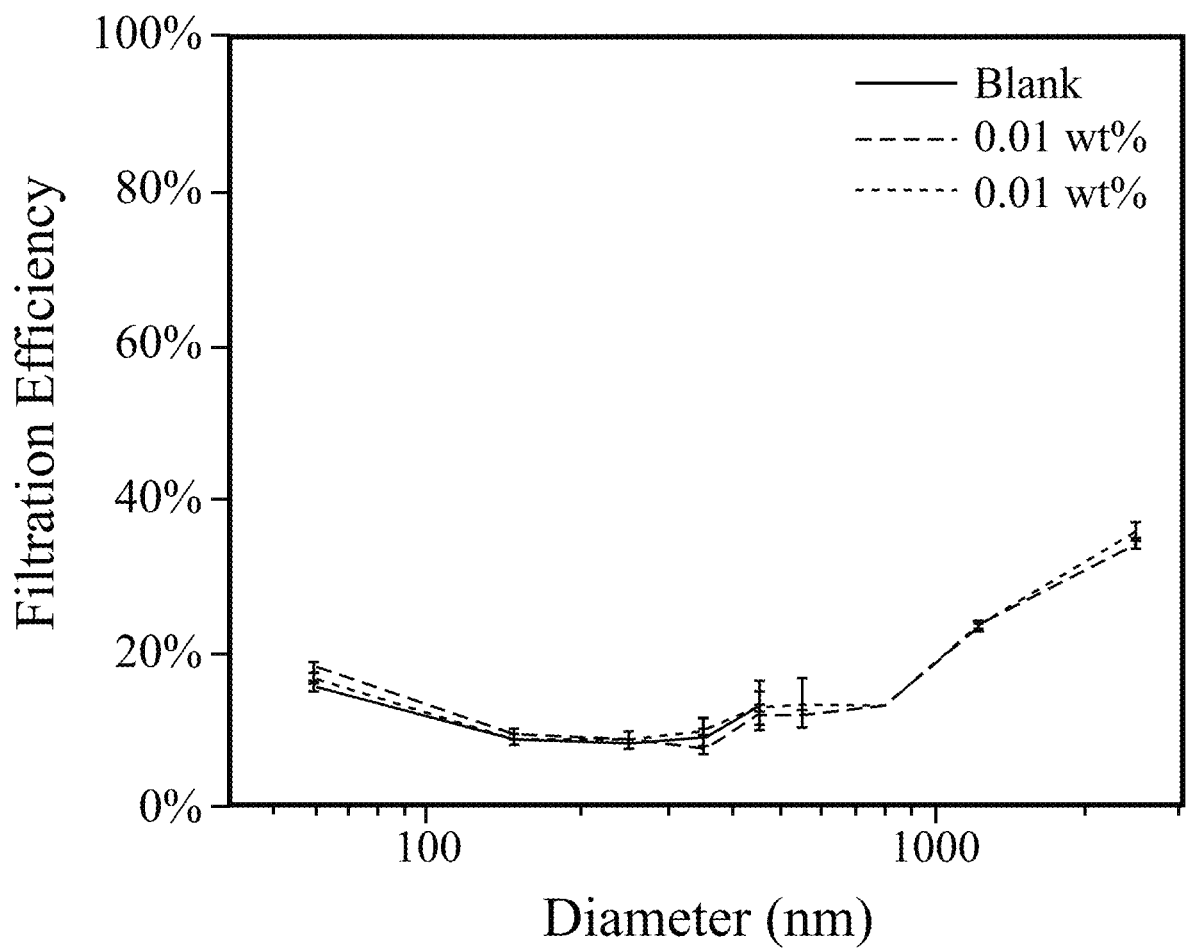
FIG. 16 illustrates size-resolved filtration efficiencies calculated as a function of particle number distribution, according to some embodiments of the present disclosure. The whiskers represent standard error (N=4).
Figure 17:
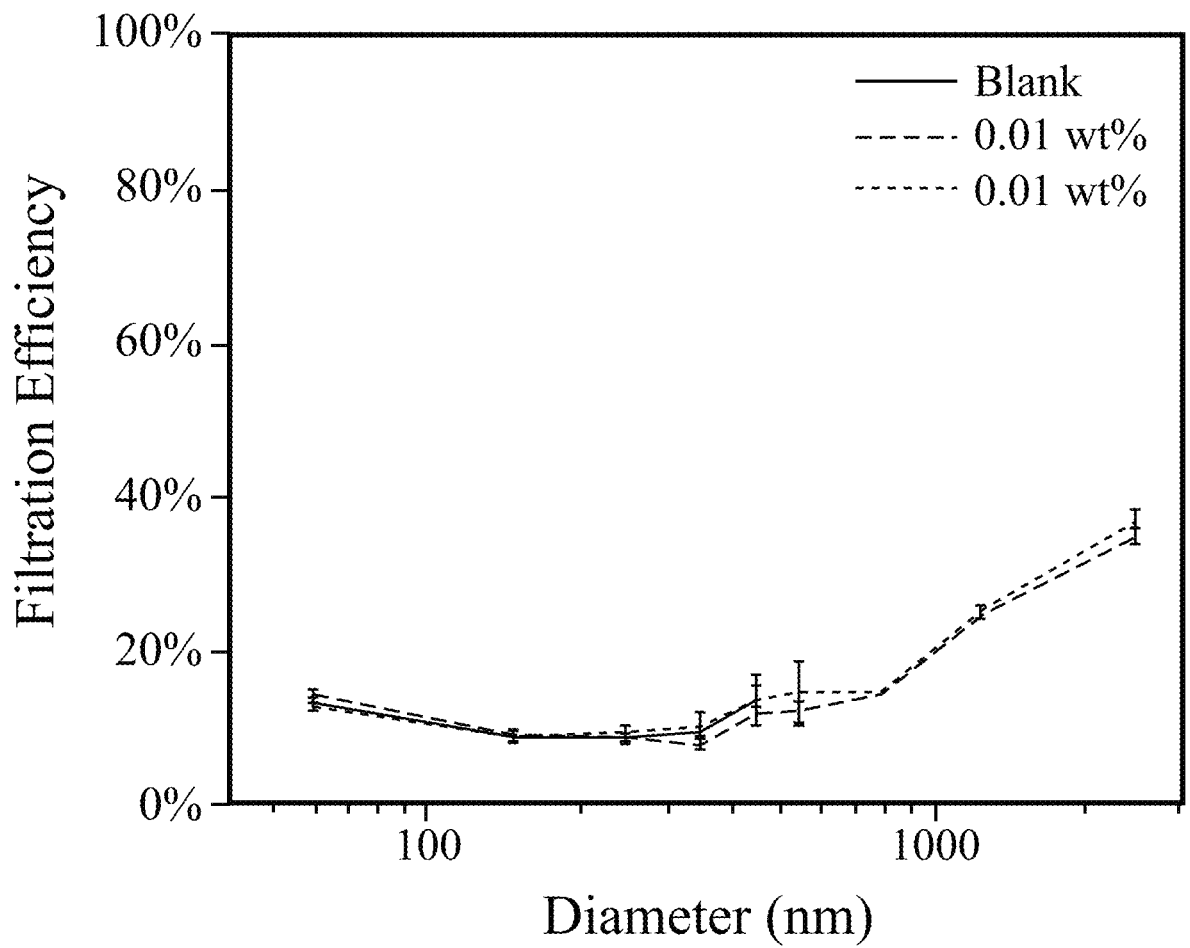
FIG. 17 illustrates size-resolved filtration efficiencies calculated as a function of particle mass distribution, according to some embodiments of the present disclosure. The whiskers represent standard error (N=4).

Next, some of the SEM images were segmented using and the distribution of approximate pore cross-sectional areas were computed in Image J. Examples of the original and segmented images are shown in FIG. 5. The cumulative frequency distributions for 3 different CNF loadings and the control fabric are shown in FIG. 6. These data reveal the expected trends of decreasing pore size distribution with increasing CNF loading.

In addition, the effect of CNF loading on the filtration behavior of fabric material in terms of filtration efficiency and inhalation resistance was studied by comparing the results for control sample with samples coated with 0.01 wt %, 0.05 wt % and 0.5 wt % CNF suspension. The samples were pre-conditioned at 85±5% relative humidity and 38±2.5° C. for 25±1 hours. After conditioning, the samples were either tested immediately or sealed in a gas-tight container and tested within 10 hours. The results are summarized in Table 1 below:

TABLE 1

| | Average Filtration Efficiency (± standard deviation) | | | Average Inhalation Resistance |
|---|---|---|---|---|
| Sample | In terms of particle mass at 300 nm | In terms of total particle mass | In terms of total particle number | (± standard deviation) |
| Control | 11% ± 4% | 11% ± 2% | 15% ± 1% | 1.9 ± 0.5 mm $H_2O$ |
| 0.01 wt % | 18% ± 3% | 18% ± 2% | 22% ± 1% | 2.3 ± 0.5 mm $H_2O$ |
| 0.05 wt % | 35% ± 5% | 35% ± 5% | 38% ± 6% | 12.7 ± 0.6 mm $H_2O$ |
| 0.5 wt % | 64% ± 2% | 63% ± 1% | 64% ± 1% | 68.6 ± 7.6 mm $H_2O$ |

Table 1 clearly illustrates that the average filtration efficiency increased with an increase in CNF loading. However, the CNF loading also increased the average inhalation resistance, which will affect the breathability of the filter material. According to NIOSH testing procedure for testing inhalation resistance, "The resistance for non-powered, air-purifying particulate respirators upon initial inhalation shall not exceed 35 mm water-column height." When the samples were tested for the 8 cm/seconds face velocity through the fabric material, the inhalation resistance for the sample coated with 0.5 wt % suspension exceeded the pressure drop of 35 mm water-column height.

FIGS. 7 through 10 illustrate filtration efficiencies over time for various CNF loadings on woven cotton fabric. Additional tests were performed at 0, 0.05 and 0.1 wt %. Results from these studies are summarized in FIG. 11. These results show that the inhalation resistance for the fabric sample coated with 0.1 wt % suspension also exceeded the 35 mm WC threshold (79±1 mm $H_2O$). A few hypotheses are that:

(1) The relationship between CNF loading and pressure drop is not linear;

(2) After a certain threshold loading, inhalation resistance becomes relatively constant; and (3) CNF loading is not homogeneously loaded onto the fabric, leading to high variability in the results; The order in which the inhalation resistance test is performed can affect results.

In order to address the inter sample variability, three identical samples for 0.05 and 0.075 wt % CNF loading were prepared and inhalation resistance test was done after the samples were air dried overnight followed by preconditioning for a period of 25 hours. The inhalation resistance for both the loading levels exceeded 35 mm $H_2O$ threshold. The cumulative inhalation resistance results as a function of CNF loading are summarized in FIG. 12.

These results show that the samples coated with 0.05 wt % showed a lot of variability in inhalation resistance values between the three identical samples, which was not the case with the samples coated with 0.075 wt %. This variability at lower loading levels may be due to incomplete drying of the CNF coatings after the deposition process. When the samples were attached to a 45 mm diameter steel funnel, the CNF coating around the funnel edges also started to chip away during the course of the test which can also explain the variability in results.

For reference, it is notable that of all other masks tested in our lab, no sample demonstrated a pressure drop higher than 20 mm $H_2O$, including cloth masks and bandanas (3-5 mm $H_2O$), disposable surgical masks (6-9 mm $H_2O$), and N95/KN95 respirators (13-20 mm $H_2O$).

The experimental setup for the CNF shedding experiment consisted of a glass acrylic chamber of volume~0.2 $m^3$. The chamber was fitted with a pair of rubber gloves to access the interior of the chamber and it has two access ports on the sides which can be sealed. An optical particle sizer (TSI OPS 3330) was placed inside the chamber to monitor particle concentrations. The chamber was continuously flushed with 5 LPM of HEPA filtered air to ensure the total number concentration inside the chamber was always less than 1 #/cc range.

The inlet port of the experimental chamber was connected to a HEPA filtered air supply line and the background concentrations were monitored using an Optical Particle Sizer (OPS) instrument placed inside the chamber. Once the concentrations inside the chamber reach values of less than 2 #/cc, the funnel containing blank fabric filter sample was attached to the supply air inlet and was placed on the top of the OPS inlet.

Aerosol concentrations were then monitored for 10 samples (1-minute sampling time) to investigate any additional exposure due to fabric filter material at 8 cm/sec face velocity. The funnel setup was then removed from the supply air inlet to monitor background concentrations at the end of the experiment.

The total number concentration inside the chamber remained constant throughout the entire duration of the experiment (~0.2 #/cc). The aerosol size distribution inside the chamber for the time during which the funnel was attached to the chamber inlet could then be compared with the background periods at the start and the end, as illustrated in FIG. 13. The aerosol size distribution did not change when the fabric filter attached to the funnel was placed over the OPS inlet as compared to the distribution observed for the background periods. Based on the results, it can be concluded that the fabric material does not contribute to any additional exposure when used as a filter material.

Two sample compositions of CNF-coated cotton fabric (one unwashed whereas the other was hot washed and dried once) were pre-conditioned at 85±5% relative humidity and 38±2.5° C. for 25±1 hours. After conditioning, the samples were either tested immediately or sealed in a gas-tight container and tested within 10 hours. The results for the two sample coupons are summarized Table 2 below.

TABLE 2

| Sample | Average Filtration Efficiency (± standard deviation) | | | Average Inhalation Resistance (± standard deviation) |
| --- | --- | --- | --- | --- |
| | In terms of particle mass at 300 nm | In terms of total particle mass | In terms of total particle number | |
| 0 wash cycle | 13% ± 2% | 17% ± 2% | 24% ± 1% | 3.3 ± 0.3 mm H$_2$O |
| 1 hot wash/dry cycle | 16% ± 5% | 18% ± 1% | 25% ± 2% | 3.8 ± 0.8 mm H$_2$O |

CNF coated fabric samples, which were prepared using a soaking method, were also tested. Two identical 0.01 wt % CNF coated samples were prepared by soaking the fabric samples in 200 mL CNF suspension and drying them inside the oven which was maintained at 70° C. The blank sample was prepared by soaking the fabric in 200 mL deionized water. An important thing to point out is that some of the data is missing for the blank sample test due to instrument error. The results for the three samples are summarized in Table 3.

TABLE 3

| Sample | Average Filtration Efficiency (± standard deviation) | | | Average Inhalation Resistance (± standard deviation) |
| --- | --- | --- | --- | --- |
| | In terms of particle mass at 300 nm | In terms of total particle mass | In terms of total particle number | |
| Blank | 8% ± 2% | NA | 13% ± 1% | 0.8 ± 0.5 mm H$_2$O |
| 0.01 wt % | 7% ± 4% | 14% ± 1% | 14% ± 1% | 1.3 ± 0.5 mm H$_2$O |
| 0.01 wt % | 9% ± 2% | 12% ± 1% | 15% ± 1% | 1.2 ± 0.6 mm H$_2$O |

FIGS. 14-17 provide the corresponding filtration efficiencies over time. It can be concluded from these results that both of the CNF coated samples behaved in a similar manner, thereby resolving the issue of inter-sample variability which was observed earlier. However, there was only a slight improvement in the filtration efficiency behavior of the CNF coated fabric samples when compared with blank which means the CNF loading needs to be higher than 0.01 wt % for improved filtration performance of the fabric material.

In some embodiments of the present disclosure, the CNF described herein may be produced by controlled acid and/or enzymatic hydrolysis of delignified biomass.

In some embodiments of the present disclosure, the materials and/or compositions described herein may be incorporated into a building heating, ventilation, and air-conditioning (HVAC) system to remove, among other things, particles, particulate, microorganisms, and/or viruses from the air contained in and/or utilized by the space being serviced by the HVAC system. Building HVAC systems can be particularly effective as viruses become more transmissible and achieve higher rates of morbidity. In addition to filters used in HVAC systems, the materials and/or compositions described herein may be used in filters and/or air-treatment systems in applications such as medical, biomedical, transportation (e.g., airlines, sea travel, ground transportation such as buses, trains, etc.), and/or any other internal space used by and/or occupied by humans.

Figure 18:
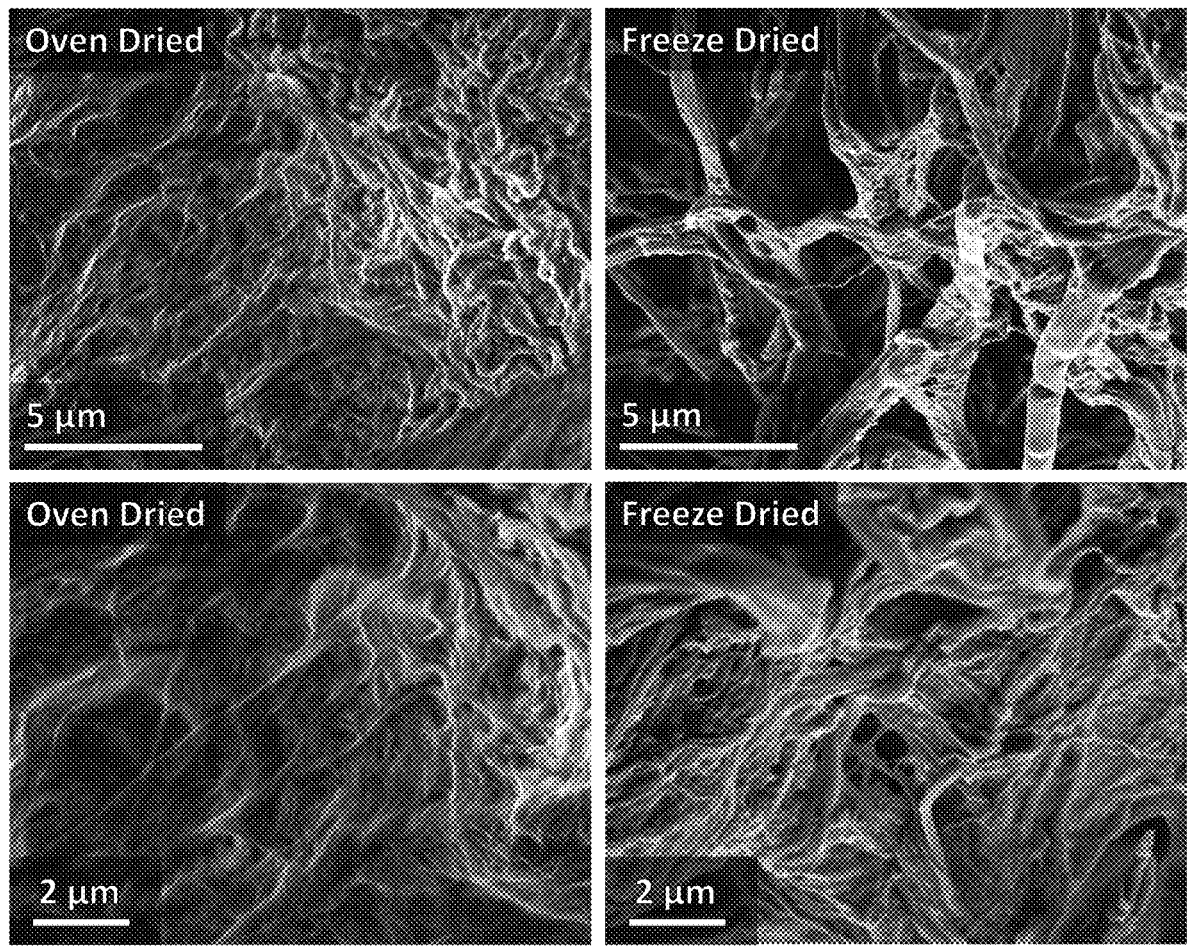
FIG. 18 illustrates a comparison of the micro and nano-structures of CNF/cotton assemblies after oven-drying (left panels) and freeze-drying (right panels), according to some embodiments of the present disclosure.

The impact of deposition and drying methods was also investigated. The vacuum deposition which was used to fabricate our first protypes was found to deposit the cellulose nanofibril material primarily on the surface of the fabric. In contrast, soaking the fabric in an aqueous solution for a period of time between about 1 minute and about 24 hours was found to result in more CNF distributed throughout the fabric interior. The effect of oven-drying vs. freeze drying was also compared. Oven drying the material at temperatures between about 50° C. and about 180° C. tended to result in aggregation of individual cellulose nanofibrils into larger bundles. These results are visualized in the left panels of FIG. 18. However, freeze-drying the CNF/fabric assembly resulted in less aggregation of the CNF relative to that produced by oven drying which allowed for a larger population of nanopores to be retained throughout the assembly. The structural features produced by freeze drying also serve to increase the tortuosity of the pores, which likely acts to reduce the pressure drop across the filtration media while maintaining a high filtration efficiency.

EXAMPLES

Example 1. A composition comprising: a base layer having an outer surface and a first thickness; and a material comprising a plurality of cellulose nanofibers in physical contact with the outer surface, wherein: the composition has an average filtration efficiency of less than or equal to 90% for particles having a characteristic length between about 50 nm and about 100 μm, and the composition is characterized by an average inhalation resistance of less than or equal to 35 mm H$_2$O as measured across the first thickness and the material.

Example 2. The composition of Example 1, wherein the material penetrates at least a portion of the first thickness of the base layer.

Example 3. The composition of either Example 1 or Example 2, wherein the base layer comprises at least one of a woven fabric or a non-woven fabric.

Example 4. The composition of any one of Examples 1-3, wherein the base layer comprises a plurality of hydroxyl groups on the outer surface.

Example 5. The composition of any one of Examples 1-4, wherein the material is bonded to the base layer by hydrogen bonding between the hydroxyl groups and the material.

Example 6. The composition of any one of Examples 1-5, wherein the material is bonded to the base layer using a crosslinking agent that reacts with at least a portion of the hydroxyl groups to form a covalent bond.

Example 7. The composition of any one of Examples 1-6, wherein the base layer comprises at least one of a cotton, a cellulose derivative fabric, a wool, a silk, or a synthetic fiber.

Example 8. The composition of any one of Examples 1-7, wherein the base layer comprises at least one of a polyester or a polypropylene.

Example 9. The composition of any one of Examples 1-8, wherein the base layer comprises a woven fabric having a thread count between about 100 per inch and about 500 per inch.

Example 10. The composition of any one of Examples 1-9, wherein the base layer is a non-woven fabric configured for an HVAC filter having a minimum efficiency reporting value (MERV) between about 1 and about 20.

Example 11. The composition of any one of Examples 1-10, wherein the first thickness is between 100 μm and 3.5 mm.

Example 12. The composition of any one of Examples 1-11, further comprising a loading of cellulose nanofibers is between 0.01 and 1 mg per square centimeter of base material.

Example 13. The composition of any one of Examples 1-12, wherein the composition is substantially insoluble in water at temperatures less than about 100° C.

Example 14. A method comprising: preparing a slurry comprising cellulose nanofibers in a liquid; depositing the slurry onto a base layer, resulting in a coating of the slurry on a first surface of the base layer; and removing at least a portion of the liquid, resulting in the forming solid cellulose nanofibers on and in the base layer.

Example 15. The method of Example 14, wherein the liquid comprises at least one of water or an organic solvent.

Example 16. The method of either Example 14 or Example 15, wherein the cellulose nanofibers are present in the slurry at a concentration between about 0.001 wt % and about 1 wt %.

Example 17. The method of any one of Examples 14-16, wherein the depositing is performed by at least one of filtering, dip coating, curtain coating, blade coating, spray coating, spin coating, or soaking.

Example 18. The method of any one of Examples 14-17, wherein the filtering comprises: applying the slurry to a first surface of the base layer; and applying a vacuum to a second surface of the base layer, wherein: the vacuum draws the liquid through the base layer, and the vacuum leaves at least a portion of the cellulose nanofibers as a solid layer on the base layer.

Example 19. The method of any one of Examples 14-18, wherein the vacuum is between about 1 Torr absolute and about 200 Torr absolute.

Example 20. The method of any one of Examples 14-19, wherein the vacuum is provided for a period of time between about 10 seconds and about 300 seconds.

Example 21. The method of any one of Examples 14-20, wherein the slurry further comprises a crosslinker comprising at least one of a compound comprising a carboxylic acid group such as citric acid, a compound comprising an epoxide, or a compound comprising an acryloyl functional group.

Example 22. The method of any one of Examples 14-21 further comprising, after the preparing: heating the or irradiating the slurry and the base layer, wherein: the heating or irradiation results in the crosslinker reacting with at least one of the cellulose nanofibers or the base layer.

Example 23. The method of any one of Examples 14-22, wherein the heating or irradiating is performed for a period of time between about 10 seconds and about 20 minutes.

Example 24. The method of any one of Examples 14-23, wherein the heating is performed at a temperature up to about 100° C. for a period of time between about 1 minute and about 10 hours.

Example 25. A filter media comprising: a composition comprising: a base layer having an outer surface and a first thickness; and a material comprising a plurality of cellulose nanofibers in physical contact with the outer surface, wherein: the composition has an average filtration efficiency of less than or equal to 90% for particles having a characteristic length between about 50 nm and about 100 μm, and the composition is characterized by an average inhalation resistance of less than or equal to 35 mm $H_2O$ as measured across the first thickness and the material.

Example 26. The filter media of Example 25, wherein the filter media is configured for at least one of a building application or a transportation-cabin application.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. Whereas certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composite comprising:
   a woven cotton fabric having an outer surface and a thickness; and
   a plurality of cellulose nanofibers in physical contact with the outer surface, wherein:
   the cellulose nanofibers penetrate into at least a portion of the thickness of the woven cotton fabric,
   the cellulose nanofibers are present on the woven cotton fabric at a loading between 0.01 mg and 1 mg per square centimeter of woven cotton fabric,
   the woven cotton fabric comprises a plurality of hydroxyl groups bonded to the outer surface,
   the cellulose nanofibers are at least partially bonded to the woven cotton fabric by hydrogen bonding between the hydroxyl groups and the cellulose nanofibers,
   the composite has an average filtration efficiency of less than or equal to 90% for particles having a characteristic length between about 50 nm and about 100 μm, and the composite is characterized by an average inhalation resistance of less than or equal to 35 mm $H_2O$ as measured across the thickness and the material.

2. The composite of claim 1, wherein the cellulose nanofibers are additionally bonded to the woven cotton fabric by a crosslinking agent that reacts with the hydroxyl groups to form a covalent bond.

3. The composite of claim 1, wherein the woven cotton fabric comprises a woven fabric having a thread count between about 100 per inch and about 500 per inch.

4. The composite of claim 1, wherein the thickness is between 100 μm and 3.5 mm.

5. The composite of claim 1, wherein the composite is substantially insoluble in water at temperatures less than about 100° C.

6. The composite of claim 1, wherein the composite is biodegradable.

7. The composite of claim 1, wherein the woven cotton fabric has a thread count between about 100 per inch and about 500 per inch.

8. A method comprising:
preparing a slurry comprising cellulose nanofibers in a liquid;
depositing the slurry onto a first surface of a woven cotton fabric having a thickness, resulting in a coating of the slurry on the first surface of the woven cotton fabric; and
removing at least a portion of the liquid, resulting in the depositing of the cellulose nanofibers on the first surface, wherein:
the cellulose nanofibers penetrate into at least a portion of the thickness of the woven cotton fabric.

9. The method of claim 8, wherein the liquid comprises at least one of water or an organic solvent.

10. The method of claim 8, wherein the cellulose nanofibers are present in the slurry at a concentration between about 0.001 wt % and about 1 wt %.

11. The method of claim 8, wherein the depositing of the slurry is performed by at least one of filtering, dip coating, curtain coating, blade coating, spray coating, spin coating, or soaking.

12. The method of claim 11, wherein the filtering comprises:
applying the slurry to the first surface of the woven cotton fabric; and
applying a vacuum to a second surface of the woven cotton fabric, wherein:
the vacuum draws the liquid through the thickness of the woven cotton fabric.

13. The method of claim 12, wherein the vacuum is between about 1 Torr absolute and about 200 Torr absolute.

14. A filter media comprising:
a composite comprising:
a woven cotton fabric having an outer surface and a thickness; and
a plurality of cellulose nanofibers in physical contact with the outer surface, wherein:
the cellulose nanofibers penetrate into at least a portion of the thickness of the woven cotton fabric,
the cellulose nanofibers are present on the woven cotton fabric at a loading between 0.01 mg and 1 mg per square centimeter of woven cotton fabric,
the woven cotton fabric comprises a plurality of hydroxyl groups bonded to the outer surface,
the cellulose nanofibers are at least partially bonded to the woven cotton fabric by hydrogen bonding between the hydroxyl groups and the cellulose nanofibers,
the composite has an average filtration efficiency of less than or equal to 90% for particles having a characteristic length between about 50 nm and about 100 μm, and
the composite is characterized by an average inhalation resistance of less than or equal to 35 mm $H_2O$ as measured across the thickness and the material.

\* \* \* \* \*